(12) United States Patent
Holzmann et al.

(10) Patent No.: US 8,754,600 B2
(45) Date of Patent: Jun. 17, 2014

(54) METHOD AND DEVICE FOR IDENTIFYING A REVERSING OPERATION IN AN ELECTRIC ACTUATING UNIT OF A VEHICLE

(75) Inventors: Stefan Holzmann, Gaweinstal (AT); Wolfgang Köllner, Vienna (AT); Roman Moraweg, Vienna (AT)

(73) Assignee: Continental Automotive GmbH, Hannover (DE)

( * ) Notice: Subject to any disclaimer, the term of this patent is extended or adjusted under 35 U.S.C. 154(b) by 858 days.

(21) Appl. No.: 12/679,953

(22) PCT Filed: Sep. 11, 2008

(86) PCT No.: PCT/EP2008/062021
§ 371 (c)(1),
(2), (4) Date: Jun. 30, 2010

(87) PCT Pub. No.: WO2009/043698
PCT Pub. Date: Apr. 9, 2009

(65) Prior Publication Data
US 2010/0283417 A1 Nov. 11, 2010

(30) Foreign Application Priority Data
Sep. 26, 2007 (DE) .................. 10 2007 045 986

(51) Int. Cl.
*H03K 5/00* (2006.01)

(52) U.S. Cl.
USPC .................. 318/400.13; 318/400.01; 318/700

(58) Field of Classification Search
USPC .................. 318/400.01, 400.13, 700
See application file for complete search history.

(56) References Cited

U.S. PATENT DOCUMENTS

| | | | | |
|---|---|---|---|---|
| 4,054,820 | A | * | 10/1977 | Foster ............................ 318/603 |
| 4,353,016 | A | * | 10/1982 | Born ......................... 318/400.23 |
| 4,591,770 | A | | 5/1986 | Isobe et al. .................... 318/565 |
| 4,797,827 | A | * | 1/1989 | Cockerham ................... 701/101 |
| 5,285,138 | A | * | 2/1994 | Okada ........................... 318/280 |
| 5,410,226 | A | * | 4/1995 | Sekiguchi et al. ............. 318/266 |
| 6,624,603 | B2 | | 9/2003 | Preymann ..................... 318/281 |
| 6,992,451 | B2 | * | 1/2006 | Kamio et al. ............... 318/400.4 |

(Continued)

FOREIGN PATENT DOCUMENTS

| | | | |
|---|---|---|---|
| DE | 4243934 A1 | 6/1994 | ............. G01B 21/02 |
| DE | 102005006694 | 8/2006 | ............... G01B 7/30 |
| DE | 102005047366 | 4/2007 | ............... H02P 6/16 |
| EP | 0128959 | 12/1984 | ............. G05B 23/02 |
| EP | 1050745 | 11/2000 | ............. G01D 5/245 |
| EP | 1175598 | 9/2004 | ............. G01D 5/245 |
| JP | 03046982 A * | 2/1991 | ............... B66B 3/02 |
| WO | WO 2007014947 A1 * | 2/2007 | |

OTHER PUBLICATIONS

International Search Report and Written Opinion for Application No. PCT/EP2008/062021 (12 pages), Mar. 18, 2009.

*Primary Examiner* — Kawing Chan
(74) *Attorney, Agent, or Firm* — King & Spalding L.L.P.

(57) ABSTRACT

In a method and a device for identifying a reversing operation in an electric actuating unit of a vehicle, once a trapped object is detected, the rotational direction of the electromotive drive is commutated. Sequential pulse interval counter values, derived from a sensor system or data derived from the values is or are written to a ring buffer store and compared with pre-defined reference data patterns. If a match is found, the counter reading of the position counter is corrected in accordance with the pre-defined reference data pattern. This ensures that the counter reading of the position counter is correct even after a reversing operation.

16 Claims, 3 Drawing Sheets

(56) References Cited

U.S. PATENT DOCUMENTS

| | | | |
|---|---|---|---|
| 7,307,395 B2* | 12/2007 | Bouamra et al. | 318/445 |
| 7,358,480 B2* | 4/2008 | Mullet et al. | 250/231.13 |
| 7,426,877 B2 | 9/2008 | Ehrlich et al. | 73/862.328 |
| 8,368,388 B2* | 2/2013 | Lohberg et al. | 324/174 |
| 2002/0008483 A1* | 1/2002 | Kaeufl et al. | 318/280 |
| 2002/0036475 A1* | 3/2002 | Okamoto | 318/445 |
| 2005/0146294 A1* | 7/2005 | Oneda | 318/85 |
| 2005/0212473 A1* | 9/2005 | Yamamoto | 318/466 |
| 2007/0087895 A1* | 4/2007 | Schweizer et al. | 477/78 |
| 2009/0278711 A1* | 11/2009 | Lohberg et al. | 341/11 |

\* cited by examiner

METHOD AND DEVICE FOR IDENTIFYING A REVERSING OPERATION IN AN ELECTRIC ACTUATING UNIT OF A VEHICLE

CROSS-REFERENCE TO RELATED APPLICATIONS

This application is a U.S. National Stage Application of International Application No. PCT/EP2008/062021 filed Sep. 11, 2008, which designates the United States of America, and claims priority to German Application No. 10 2007 045 986.8 filed Sep. 26, 2007, the contents of which are hereby incorporated by reference in their entirety.

TECHNICAL FIELD

The invention relates to a method and device for identifying a reversing operation in an electric actuating unit of a vehicle.

BACKGROUND

Electric actuating units in vehicles, for example sliding roofs or window raising mechanisms, are equipped with position determining means. These position determining means are necessary to allow the respective window or sliding roof to stop precisely in a predefined position. Such position determining means are also necessary to satisfy statutory requirements relating to protection against trapping.

With known position determining means in window raising mechanisms a first initialization takes place during production by moving the window to its upper mechanical stop. This is detected by a control unit and used as a reference for subsequent position counting operations. These position counting operations when the window is being raised and lowered involve counting Hall sensor pulses associated with the rotation of the respective drive motor. These pulses result from the rotation of the motor shaft, to which a magnetic wheel is secured, which is provided with alternating sectors or poles of different polarity in a circumferential direction.

Two Hall sensors with a 90° offset are generally used for position counting. It is thus possible to determine both the speed of rotation and the direction of rotation.

To reduce the costs of the drive, it is already known that just one Hall sensor can be used for position counting. This is only provided to count the pulses. Information relating to the direction of rotation is derived from the known states of the motor control relay. In this instance however position cannot be determined precisely during a reversing operation after trapping has been detected, as mechanical inertia means that the actual direction of rotation of the motor does not always correspond to the direction of rotation provided for by the instantaneous control signals of the switching relay. A position counting error therefore results. To ensure correct position counting, particularly in respect of statutory requirements relating to protection against trapping, it is however necessary for position determination to be extremely accurate.

If two Hall sensors are used for position counting, to avoid the problem of position inaccuracy, higher system costs are incurred, particularly in the motor and cable harness.

To avoid the problem of position inaccuracy it is already known that the position count can be reinitialized regularly by moving the window to its upper mechanical stop after every window movement or every nth window movement. However this has the disadvantage of placing greater strain on the mechanical system, which in turn incurs higher costs for the mechanical system. And it is not always possible. For example if the window is moved frequently and frequent trapping takes place without the window being closed or opened completely, post-initialization is not possible.

A method and device for determining the actual reversal of the direction of rotation of a following rotary drive are already known from EP 1 175 598 B1. With this method an asymmetrical rotor-side sensor wheel is used to supply pulse sequences that are proportional to speed with interim reference pulses. These pulses are detected by a single stator-side sensor and evaluated in an evaluation apparatus. This evaluation apparatus determines the actual reversal of the direction of rotation after the direction of rotation has been switched, in particular after a polarity reversal of an electric rotary drive motor, by taking into account a pulse signal correction value derived from the pulse signal count in each instance between a reference signal before and after the actual reversal of the direction of rotation that can be ascertained from a change from an instantaneous increase to an instantaneous decrease in pulse signal lengths after the direction of rotation has been switched.

A further device for determining the actual reversal of the direction of rotation of a reversing rotary drive is known from DE 10 2005 047 366 A1. This device also uses a sensor wheel with a coding structure that is configured asymmetrically in respect of distribution along the circumference of the sensor wheel and a single detector, which generates a pulse signal as a function of rotor speed by scanning the coding structure during rotation of the sensor wheel. This pulse signal is supplied to an evaluation unit, which determines the actual reversal of the direction of rotation by evaluating the pulse edges. The above-mentioned coding structure of the sensor wheel is formed by coding sectors of a first sector width and a reference coding sector pair having a second sector width.

The disadvantages of the devices described in EP 1 175 598 B1 and DE 10 2005 047 366 A1 are that an asymmetrical sensor wheel is required, only small deviations can be corrected, stable motor operation is required for correction and synchronization is lost during reversing.

SUMMARY

According to various embodiments, a way can be shown in which the above-mentioned disadvantages can be avoided.

According to an embodiment, a method for identifying a reversing operation in an electric actuating unit of a vehicle may have the following steps: —moving the electric actuating unit in a closing direction by means of an electromotive drive, —changing the value of a position counter as a function of the output signals from a sensor system, which interacts with a sensor wheel secured to the rotor shaft of the electromotive drive and having equidistant coding sectors, —verifying whether trapping is occurring, —if trapping is detected, switching the direction of rotation of the electromotive drive, —writing successive pulse interval count values determined from the output signals of the sensor system or data derived therefrom into a ring buffer, —comparing the pulse interval count values written into the ring buffer or the data derived therefrom with predefined reference data patterns, —if a correspondence of the pulse interval count values written into the ring buffer or the data derived therefrom to a predefined reference data pattern is identified, correcting the position counter as a function of the predefined reference data pattern.

According to a further embodiment, three different reference data patterns can be predefined and the pulse interval count values may be written into the ring buffer or the data derived therefrom may be compared with these three reference data patterns. According to a further embodiment, the position counter can be corrected even when the motor stops. According to a further embodiment, only data derived from successive pulse interval count values, which shows whether the time intervals between two respectively successive pulses are becoming longer, remaining the same or becoming shorter, may be stored in the ring buffer. According to a further embodiment, the comparison can be only carried out when motor transition phases occur. According to a further embodiment, the comparison can always be carried out when a pulse is supplied at the output of the sensor system.

According to yet another embodiment, a device for identifying a reversing operation in an electric actuating unit of a vehicle may have: —a sensor wheel having equidistant coding sectors and being connected in a non-rotatable fashion to the rotor shaft of an electromotive drive driving the electric actuating unit, —a sensor system, which emits pulse signals during rotation of the sensor wheel, —an evaluation unit connected to the sensor system, —a position counter, —a ring buffer, into which successive pulse interval count values or data derived therefrom is/are written after trapping has been detected, and—a reference data storage unit in which predefined reference data patterns are stored, wherein—the evaluation unit is provided to compare the data written into the ring buffer with the predefined reference data patterns.

According to a further embodiment of the device, three different reference data patterns can be stored in the reference data storage unit. According to a further embodiment of the device, the evaluation unit can be provided, when a correspondence is identified between the data written into the ring buffer and one of the reference data patterns, to correct the count value in the position counter as a function of the reference data pattern. According to a further embodiment of the device, the sensor system may have a single Hall sensor. According to a further embodiment of the device, the electric actuating unit can be a window raising mechanism or a sliding roof. According to a further embodiment of the device, the evaluation unit may write data into the ring buffer, which is derived from successive pulse interval count values and shows whether the time intervals between respectively successive pulses are becoming longer, remaining the same or becoming shorter.

BRIEF DESCRIPTION OF THE DRAWINGS

Further advantageous characteristics of the invention will emerge from the description of said invention based on examples with reference to the figures, in which.

DETAILED DESCRIPTION

The advantages of various embodiments consist in particular of the fact that position counting also takes place correctly during a reversing operation so that the position inaccuracies described above do not occur or are at least greatly reduced. These advantages are essentially achieved in that count values are constantly written into a ring buffer, the count values corresponding to the time between respectively successive edges of the pulse signal, and the changes occurring in the pulse lengths are analyzed when a reversing operation occurs, by searching for predefined reference data patterns in the count values stored in the ring buffer. If one of the predefined reference data patterns is identified, it is then possible to deduce the precise reversing time and therefore correct the resulting counting operation.

Figure 1:
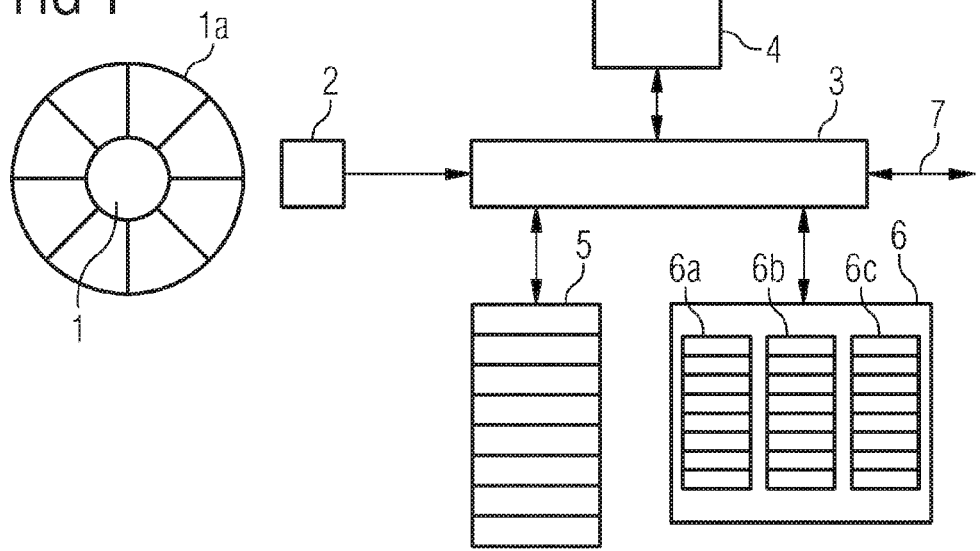
FIG. 1 shows a block diagram, which contains the components of a device for identifying a reversing operation in an electric actuating unit of a vehicle that according to an embodiment.

FIG. 1 shows a block diagram, which shows the components of a device for identifying a reversing operation in an electric actuating unit of a vehicle according to various embodiments. This electric actuating unit is a window raising mechanism of the vehicle. The window is raised and lowered by means of an electromotive drive, which has a stator and rotor, the rotor having a rotor shaft 1.

A sensor wheel 1a is connected in a non-rotatable fashion to the rotor shaft 1. The sensor wheel has equidistant coding sectors or poles. As the sensor wheel 1a rotates, pulse signals are detected by a sensor system 2 and supplied to an evaluation unit 3, which is formed by a microcomputer. The evaluation unit 3 increases the position count value stored in a position counter 4 on receipt of each pulse, so that the counter reading of the position counter 4 describes the instantaneous position of the window precisely.

If trapping is detected during a closing operation of the window, the direction of rotation of the electromotive drive is switched, so that the window opens again and the trapped object is released. This is achieved by appropriate activation of switching relays. Due to the inertia of the mechanical system the actual direction of rotation of the motor does not always correspond to the direction of rotation predefined by the instantaneous control signal during this reversing operation.

To prevent counting errors occurring during this reversing operation and incorrect count values remaining in the position counter 4 at the end of the reversing operation, a ring buffer 5 is provided in the device illustrated in FIG. 1. The evaluation unit 3 writes pulse interval count values into this ring buffer 5, said pulse interval count values respectively describing the temporal interval between two successive pulses of the pulse signal supplied by the sensor system 2. As an alternative to the pulse interval count values data derived from the pulse interval count values can also be written into the ring buffer 5, this data showing whether the time interval between two successive pulses has become longer, remained the same or become shorter. The data stored in the ring buffer 5 therefore corresponds to an actual pulse pattern.

This actual pulse pattern is constantly compared by the evaluation unit 3 with three predefined reference data patterns RM1, RM2 and RM3, which were stored in a reference data storage unit 6 during production of the device in the factory. The reference data storage unit 6 has three storage areas 6a, 6b and 6c, with the data corresponding to the reference data pattern RM1 being stored in the storage area 6a, the data corresponding to the reference data pattern RM2 being stored in the storage area 6b and the data corresponding to the reference data pattern RM3 being stored in the storage area 6c.

If the evaluation unit 3 identifies a correspondence between the pulse interval count values written into the ring buffer 5 or the data derived therefrom and a reference data pattern RM1, RM2 or RM3 stored in the reference data storage unit 6, the control unit 3 can deduce the precise reversing time and correct the counter reading of the position counter 4 accordingly.

Figure 2:
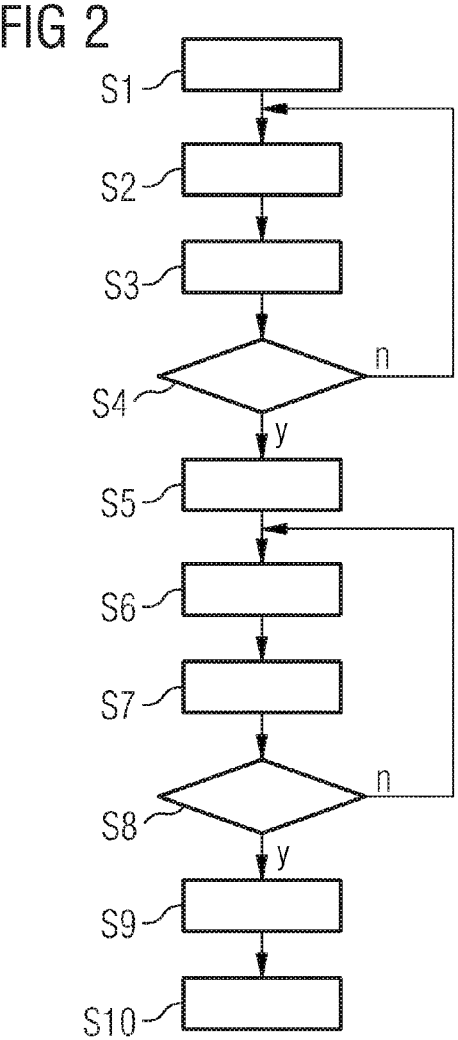
FIG. 2 shows a flow diagram to explain a method for identifying a reversing operation in an electric actuating unit of a vehicle.

FIG. 2 shows a flow diagram to explain a method for identifying a reversing operation in an electric actuating unit of a vehicle, the electric actuating unit being a window raising mechanism of the vehicle.

The method starts in step S1. In step S2 the window is moved in a closing direction by means of an electromotive drive, to the rotor shaft 1 of which the sensor wheel 1*a* is secured.

The output pulses of the sensor system 2 detected during the movement of the window are supplied to the evaluation unit 3 and used by way of this according to step S3 to change the counter reading of the position counter 4.

As the window moves, in step S4 it is detected whether trapping takes place. If not, the method returns to step S2. If trapping is detected however, the method moves on to step S5.

In step S5 the direction of rotation of the electromotive drive is switched by changing the actuation of the switching relay of the electromotive drive. The pulse interval count value, which shows the time interval between two successive pulses or the pulse signal supplied by the sensor system 2, is also written in step S6.

In the following step S7 a comparison takes place between the pulse interval count values stored in the ring buffer 5 or the data derived therefrom and the predefined reference data patterns RM1, RM2 and RM3.

In step S8 it is verified whether the pulse interval count values stored in the ring buffer 5 or the data derived therefrom correspond(s) to one of the predefined reference data patterns. If not, the method returns to step S6. If so, the method moves on to step S9.

In step S9 the evaluation unit 3 corrects the counter reading of the position counter 4 as a function of the predefined reference data pattern, which was detected as corresponding to the data stored in the ring buffer 5.

The method then moves on to step S10, which represents the end of the method.

In one preferred embodiment only data derived from successive pulse interval count values, which shows whether the time intervals between two respectively successive pulses are becoming longer, remaining the same or becoming shorter, is to be stored in the ring buffer 5. In this embodiment data is also stored in the storage areas 6*a*, 6*b* and 6*c* of the reference data storage unit 6, which corresponds respectively to such a reference data pattern.

As described below with reference to FIGS. 3, 4 and 5, there are three different reference data patterns, with a long reverse pulse occurring according to the first of these reference data patterns, a short reverse pulse occurring according to the second of these reference data patterns and a reverse pulse of medium length occurring according to the third of these reference data patterns.

Figure 3:
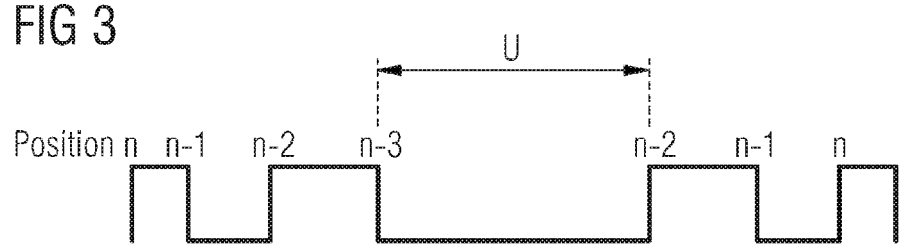
FIG. 3 shows a diagram showing pulse patterns in the presence of a long reverse pulse.
Figure 3:
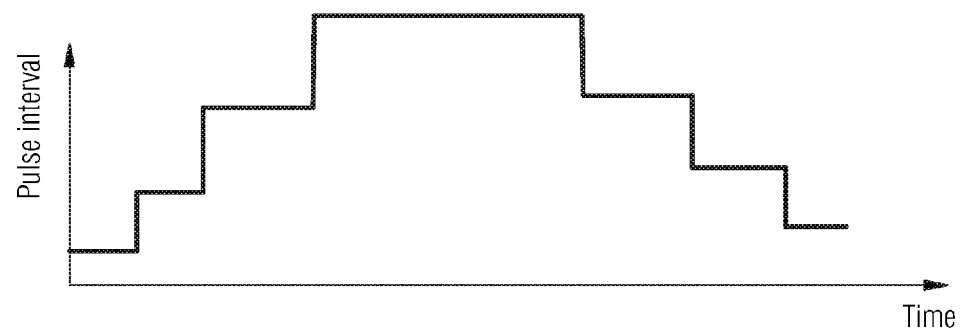

FIG. 3 shows a diagram showing pulse patterns in the presence of a long reverse pulse. The upper part of the diagram shows the pulses supplied by the sensor system 2 and the lower part shows the pulse interval count values derived therefrom, in both instances over time. It is evident from the upper part of the diagram that after the activation of the switching relay of the electromotive drive has been switched, the rotation of the rotor shaft first becomes slower, i.e. the intervals between successive pulses become longer, and then faster again, i.e. the intervals between successive pulses become increasingly shorter again. The reversing time is—as shown in FIG. 3 by the double arrow and letter U—during the longest pulse. The subsequent edge of the pulse signal is therefore counted in the other movement direction.

Figure 4:
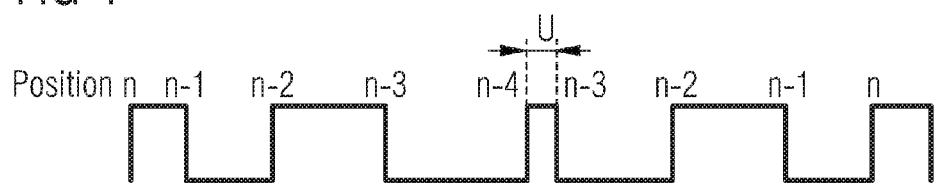
FIG. 4 shows a diagram showing pulse patterns in the presence of a short reverse pulse and FIG. 5 shows a diagram showing pulse patterns in the presence of a reverse pulse of medium length.
Figure 4:
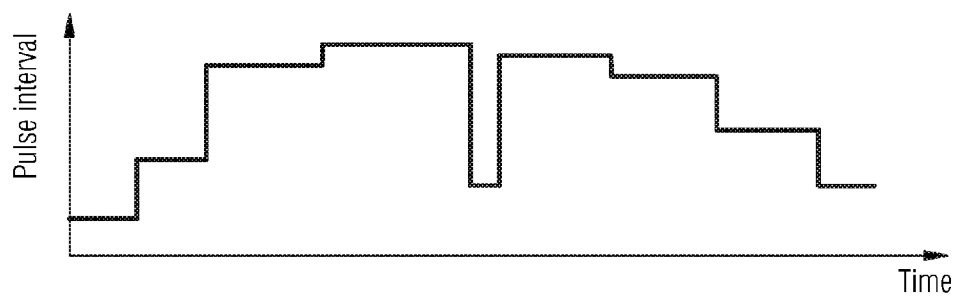

FIG. 4 shows a diagram showing pulse patterns in the presence of a short reverse pulse. The upper part of the diagram here shows the pulses supplied by the sensor system 2 and the lower part shows the pulse interval count values derived therefrom, in both instances over time. It is evident that after the activation of the switching relay of the electromotive drive has been switched, the rotation of the rotor shaft first becomes slower, then a single short pulse length follows, after which the pulse intervals become shorter again, i.e. the rotation of the rotor shaft becomes faster again. The reversing time is—as shown in FIG. 4 by the double arrow and letter U—during the short pulse. The edge after this short pulse is the first pulse to be counted in the other movement direction again.

Figure 5:
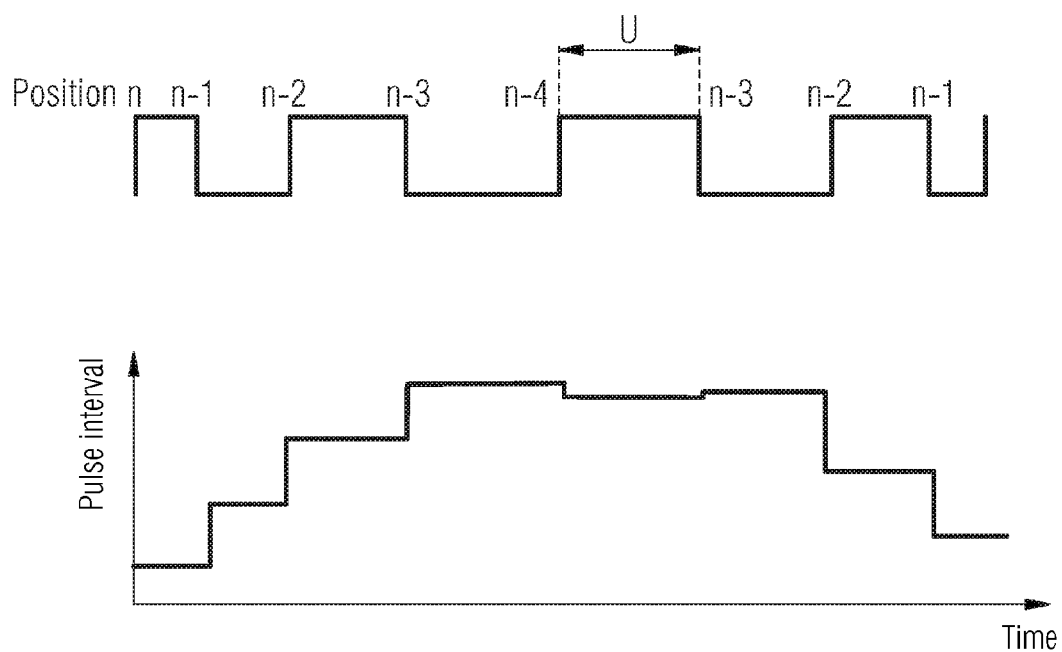

FIG. 5 shows a diagram showing pulse patterns in the presence of a reverse pulse of medium length. The upper part of the diagram here shows the pulses supplied by the sensor system 2 and the lower part shows the pulse interval count values derived therefrom, in both instances over time. It is evident that after the activation of the switching relay of the electromotive drive has been switched, the rotation of the rotor shaft 1 first becomes slower, i.e. the pulse intervals become longer, then three pulse of roughly equal length follow, the pulse intervals therefore remaining roughly the same, and finally the rotation of the rotor shaft 1 becomes increasingly faster again, i.e. the pulse intervals become increasingly shorter again. In this instance the reversing time is—as shown in FIG. 5 by the double arrow and letter U—during the second of the three pulse intervals of roughly equal length. The following pulse is the first pulse to be counted in the other movement direction again.

According to various embodiments it is verified in the light of all this with every reversing operation that occurs whether the actual pulse pattern written into the ring buffer 5 corresponds to one of the reference data patterns stored in the reference data storage unit 6. If such a correspondence is identified, the counter reading of the position counter can be corrected as necessary.

Such a comparison of an actual pulse pattern with reference data patterns and the subsequent correction of the counter reading of the position counter can advantageously also be carried out when the motor is running down. It is also possible during such a motor stopping operation for the window to spring back a little when it stops at the edge of the seal for example. Therefore when the motor is running down, if an acceleration, i.e. shorter pulse intervals, is ascertained after a delayed movement, these latter pulses are counted in the counter movement direction.

It is also possible, if the motor is switched off in the event of a mechanical block for example during initialization, for the window to spring back. Therefore after switching off after blocking has been identified, all subsequent pulses are counted in the counter movement direction.

The above-mentioned comparison of the pulse interval count values written into the ring buffer 5 or the data derived therefrom with the predefined reference data patterns is carried out when motor transition phases occur, in other words when a reversal of the direction of rotation occurs or the motor stops. It is also carried out when a pulse is supplied at the output of the sensor system 2.

The subject matter of the present invention can be used in particular in association with window raising mechanisms and sliding roofs of vehicles. The subject matter of the invention is particularly suitable for window raising architectures, in which the electronic system is separate from the electromotive drive, since in such applications the use of a sensor system with only one Hall sensor allows the greatest cost savings to be achieved.

What is claimed is:

1. A method for identifying a reversing operation in an electric actuating unit of a vehicle, the method comprising:
    moving the electric actuating unit in a closing direction with an electromotive drive,
    changing a value of a position counter as a function of output signals from a sensor system including a single Hall sensor, which interacts with a sensor wheel secured to a rotor shaft of the electromotive drive and having equidistant coding sectors,
    verifying whether trapping is occurring,
    if trapping is detected, switching the direction of rotation of the electromotive drive, and responsive to switching the direction of rotation of the electromagnetic drive,
        writing successive pulse interval count values determined from the output signals of the sensor system or data derived therefrom, the pulse interval count values representing an actual data pattern related to actual reversal of the direction of rotation of the electromagnetic drive, into a ring buffer,
        comparing the pulse interval count values written into the ring buffer or the data derived therefrom with predefined reference data patterns which are characteristic for different reversal situations and stored in a reference data storage,
        identifying a correspondence of the pulse interval count values or the data derived therefrom written into the ring buffer to one of the predefined reference impulse or data patterns stored in the reference data storage; and
        correcting the position counter as a function of the identified corresponding predefined reference data pattern in order to correct for a deviation of the position counter due to a mechanical inertia of the electric actuating unit.

2. The method according to claim 1, wherein three different reference data patterns are predefined and the pulse interval count values written into the ring buffer or the data derived therefrom is/are compared with these three reference data patterns.

3. The method according to claim 1, wherein characterized in that the position counter is corrected even when the motor stops.

4. The method according to claim 1, wherein only data derived from successive pulse interval count values, which shows whether the time intervals between two respectively successive pulses are becoming longer, remaining the same or becoming shorter, is stored in the ring buffer.

5. The method according to claim 1, wherein the comparison is only carried out when motor transition phases occur.

6. The method according to claim 1, wherein the comparison is always carried out when a pulse is supplied at the output of the sensor system.

7. A device for identifying a reversing operation in an electric actuating unit of a vehicle comprising:
    a sensor wheel having equidistant coding sectors and being connected in a non-rotatable fashion to a rotor shaft of an electromotive drive driving the electric actuating unit,
    a sensor system, including a single Hall sensor, which emits pulse signals during rotation of the sensor wheel,
    an evaluation unit connected to the sensor system, and
    a position counter,
    a ring buffer into which successive pulse interval count values or data derived therefrom, the pulse interval count values or data derived therefrom representing an actual data pattern related to actual reversal of the direction of rotation of the electromagnetic drive, is/are written after trapping has been detected, and
    a reference data storage unit in which predefined reference impulse or data patterns are stored, the predefined reference impulse or data patterns characteristic of different reversal situations, wherein
    the evaluation unit is configured to compare the data written into the ring buffer with the predefined impulse or reference data patterns responsive to switching the direction of rotation of the electromagnetic drive,
    wherein the evaluation unit is provided
        to identify, a correspondence between the data written into the ring buffer and one of the impulse or reference data patterns, and
        to correct the count value in the position counter as a function of the identified corresponding reference data pattern in order to correct for a deviation of the position counter due to a mechanical inertia of the electric actuating unit.

8. The device according to claim 7, wherein three different reference data patterns are stored in the reference data storage unit.

9. The device according to claim 7, wherein the electric actuating unit is a window raising mechanism or a sliding roof.

10. The device according to claim 7, wherein the evaluation unit writes data into the ring buffer, which is derived from successive pulse interval count values and shows whether the time intervals between respectively successive pulses are becoming longer, remaining the same or becoming shorter.

11. A method for identifying a reversing operation in an electric actuating unit of a vehicle comprising
    moving the electric actuating unit in a closing direction,
    changing a position value as a function of output signals sensed from a rotor shaft using a single Hall sensor,
    verifying whether trapping is occurring,
    if trapping is detected, switching the direction of the electric actuating unit, and
    responsive to switching the direction of rotation of the electromagnetic drive,
        writing successive pulse interval count values determined from output signals or data derived therefrom, the pulse interval count values representing an actual data pattern related to actual reversal of the direction of rotation of the electromagnetic drive, into a ring buffer,
        comparing the pulse interval count values written into the ring buffer or the data derived therefrom with predefined reference data patterns which are characteristic for different reversal situations and stored in a reference data storage,
        identifying a correspondence of the pulse interval count values or the data derived therefrom written into the ring buffer to one of the predefined reference impulse or data patterns stored in the reference data storage; and
        correcting the position value as a function of the identified corresponding predefined reference data pattern in order to correct for a deviation of the position counter due to a mechanical inertia of the electric actuating unit.

12. The method according to claim 11, wherein three different reference data patterns are predefined and the pulse interval count values written into the ring buffer or the data derived therefrom is/are compared with these three reference data patterns.

13. The method according to claim 11, wherein the position counter is corrected even when the motor stops.

14. The method according to claim 11, wherein only data derived from successive pulse interval count values, which shows whether the time intervals between two respectively successive pulses are becoming longer, remaining the same or becoming shorter, is stored in the ring buffer.

15. The method according to claim 11, wherein the comparison is only carried out when electric actuating unit transition phases occur.

16. The method according to claim 11, wherein the comparison is always carried out when a pulse is supplied at the output of a sensor system.

* * * * *